(12) United States Patent
Buckley

(10) Patent No.: US 6,246,935 B1
(45) Date of Patent: Jun. 12, 2001

(54) VEHICLE INSTRUMENT PANEL COMPUTER INTERFACE AND DISPLAY

(75) Inventor: Stephen J. Buckley, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/221,504

(22) Filed: Dec. 28, 1998

Related U.S. Application Data

(63) Continuation-in-part of application No. 08/980,641, filed on Dec. 1, 1997, now Pat. No. 6,032,089.

(51) Int. Cl.[7] .................................................. G06F 7/00
(52) U.S. Cl. .......................................... 701/36; 340/425.5
(58) Field of Search ........................ 701/1, 36; 307/10.1; 340/425.5, 438

(56) References Cited

U.S. PATENT DOCUMENTS 5,794,164 * 8/1998 Beckert et al. ........................ 701/36
5,819,227 * 10/1998 Obuchi .................................. 701/117
5,859,628 * 1/1999 Ross et al. ............................. 345/173

OTHER PUBLICATIONS

S.J. Buckley et al., *The Car as a Peripheral, Adapting A Portable Computer To A Vehicle Intranet*, 6 pages, Copyright 1997 Society of Automotive Engineers, Inc.

\* cited by examiner

Primary Examiner—William A. Cuchlinski, Jr.
Assistant Examiner—Edward Pipala
(74) Attorney, Agent, or Firm—Mark P. Calcaterra

(57) ABSTRACT

A communication system includes a removable computer which is information-coupled to a built-in computer system of a vehicle. The computer is removably resident in a predetermined location within the vehicle and communicates with a vehicle computer system either wirelessly or via a connectorized bus. Additionally, the removable computer is video-linked to a driver information display mounted in the instrument panel of the vehicle.

5 Claims, 6 Drawing Sheets

VEHICLE INSTRUMENT PANEL COMPUTER INTERFACE AND DISPLAY

RELATED APPLICATION

This is a continuation-in-part of U.S. application Ser. No. 08/980,641, filed Dec. 1, 1997 and issued as U.S. Pat. No. 6,032,089, filed of Feb. 29, 2000.

BACKGROUND OF THE INVENTION

The invention relates generally to computer interfacing and message exchange between communication nodes. More specifically, the invention pertains to a communication system including a stand-alone computer which is coupled to an interface for a computer system of a vehicle.

Automotive manufacturers and computer companies have discussed the feasibility of in-vehicle computers. However, these concepts have centered about a permanently installed computer in the vehicle. With the rapid evolution of computer technology, however, a permanently installed computer of a given type would quickly become obsolete as advancements in the computer art surge onward. Therefore, there is a need for a cost effective approach to link rapidly evolving stand-alone computers to vehicular systems.

SUMMARY OF THE INVENTION

Accordingly, a system for providing communication between a stand-alone removable computer and an electrical system of a vehicle includes a communication interface operative to exchange information between systems on the vehicle and the removable computer. The removable computer is placed in a predetermined location in the vehicle to enable communication with an interface to a built-in computer system of the vehicle. The removable computer is video-linked to a driver information display mounted in the instrument panel of the vehicle.

BRIEF DESCRIPTION OF THE DRAWINGS

The objects and features of the invention will become apparent from a reading of a detailed description, taken in conjunction with the drawings in which.

DETAILED DESCRIPTION

A vehicle arranged with the contemplated invention contains a sophisticated digital network to link both vehicle and external information sources. In one embodiment, the system centers on a removable palmtop computer combined with a multi-function "mode" switch on the vehicle's instrument panel. The computer is removably housed or "docked" in the instrument panel when the vehicle is driven and is removable when the vehicle is parked. The vehicle may be driven without the computer in place. There are redundant radio and HVAC displays hidden under the computer when it is housed in its docking pod for customers not desiring the palmtop computer option. Interactive functions on the computer are controlled via the "hard" tactile mode switches, "soft" on-screen switch icons, or the full computer keyboard.

One available laptop computer which may be used in the invention is the Hewlett Packard 320 LX, but it is contemplated that a variety of miniaturized computers could be employed in accordance with the invention.

The computer sits in a pocket, much like a cup holder, designed for palmtop computers. The interface allows several types of palmtop computers to be used. With the arrangement contemplated by the invention, the vehicle is a port or peripheral to the computer resident in the pod. If the vehicle operator desires this feature, the operator will provide the computer of choice and load vehicle-specific software into it. The software may be changed to distinguish different car models, but the interface would be standard. The software also is modified to reflect new model years or evolution of new installed equipment. The arrangement is adaptable, upgradeable, cost efficient and open to an abundance of software available from a variety of sources, including retail outlets.

Figure 1:
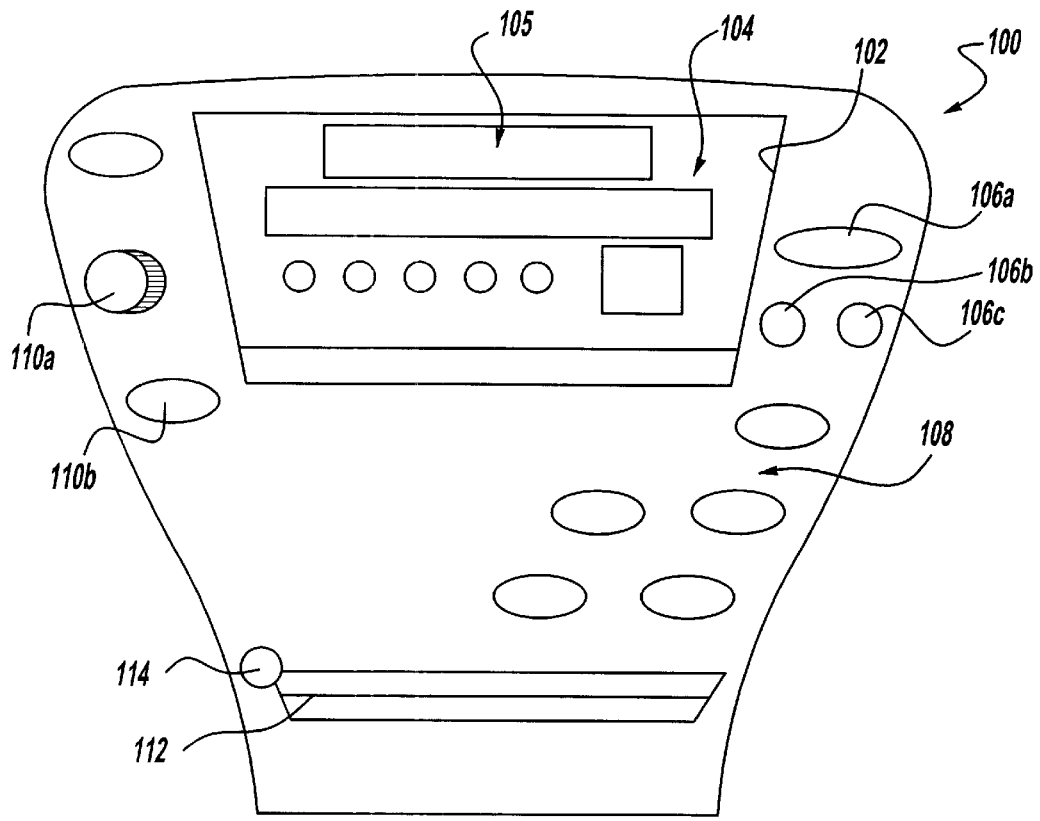
FIG. 1 is a front view of a portion of the center instrument panel of a vehicle arranged with a socket for receipt of a palmtop computer.

With reference to FIG. 1, a central instrument panel 100 includes a pod or mounting recess 102 for receipt of a palmtop computer with the floor 104 of the pod or recess providing a conventional radio and HVAC vehicle display panel 105 which is covered by the palmtop computer when placed in the pod 102.

Additionally provided at the central instrument panel 100 are cellular phone controls, such as VOLUME 106a, SEND 106b and END 106c.

An air conditioning control switch cluster is provided at 108 and includes such conventional switch controls as increase/decrease temperature, AC on/off, and fan speed increase/decrease.

Typical audio controls are shown at 110a (on/off and volume) and 110b (mode select—e.g. AM/FM/CD.) Additionally, a CD player 112 is mounted as shown and includes a CD eject switch 114.

Figure 2:
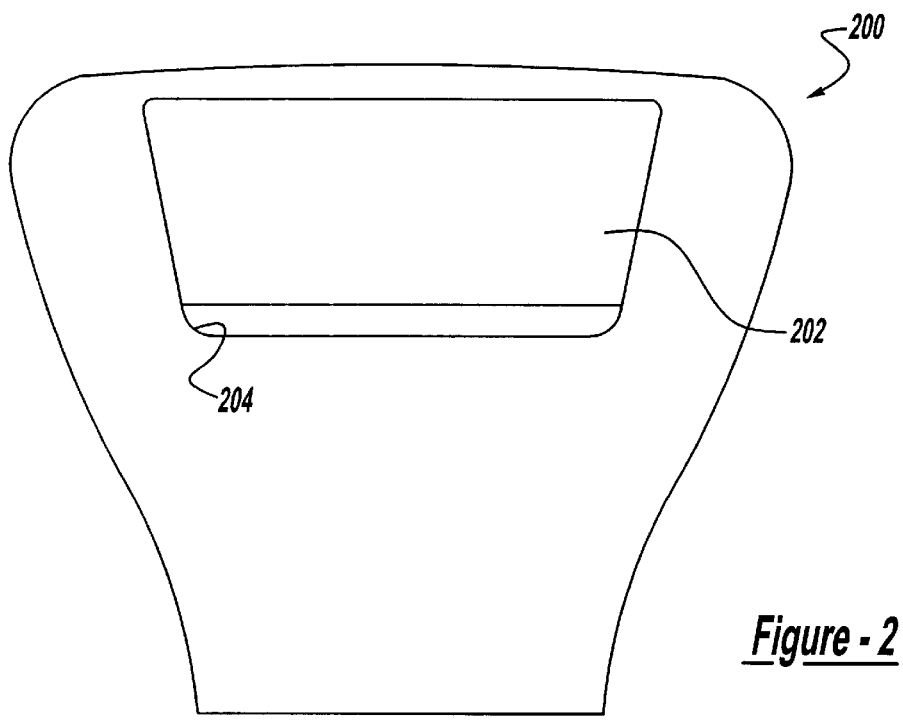
FIG. 2 is a front view of a portion of the instrument panel of FIG. 1 with a palmtop computer installed in a holder/recess therefore.

FIG. 2 is a front view of the same center instrument panel of FIG. 1, but with the panel 200 including a mounted palmtop computer 202 resident in holder pod or recess 204. With the computer option in place, the displays 105 of FIG. 1 are covered by the computer 202, and a computer display is utilized in place of such permanently mounted displays of FIG. 1 in this configuration.

Figure 3:
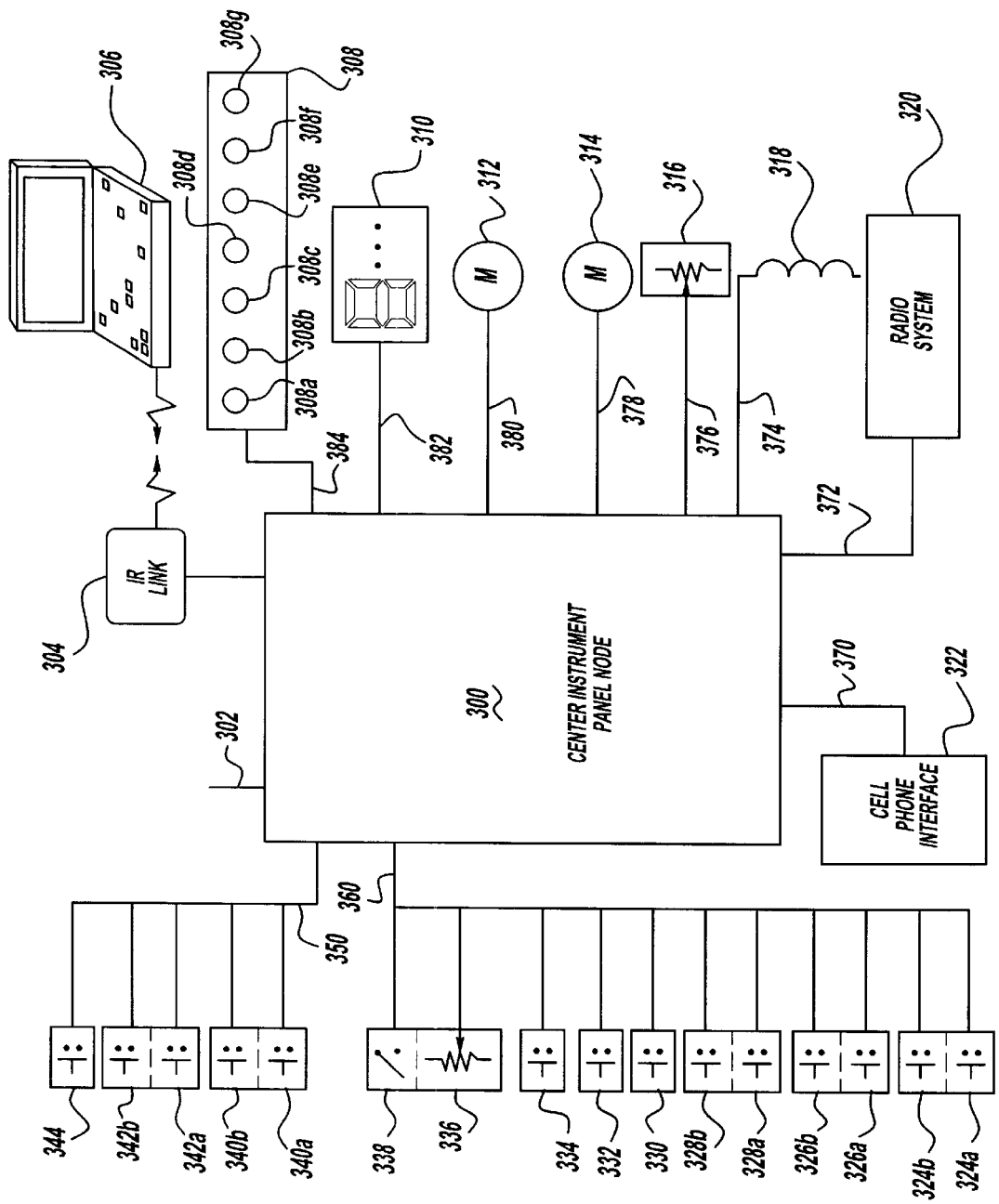
FIG. 3 is a functional block diagram of an interface node for a palmtop computer arranged in accordance with the principles of the invention.

Central to the information linkage concept of the invention is the center instrument panel node (CIPN) 300 of FIG. 3. Besides providing a "gateway" to the palmtop computer 306, the CIPN 300 also provides a central interface to the vehicular radio, HVAC, steering wheel and CIPN switch systems.

CIPN 300 includes the following system components. A microprocessor, such as the Motorola MC68HC11K4, a radio interface such as the IIC Model PCF8584 from Philips, a dual universal asynchronous receiver transmitter such as the NS16552D from National Semiconductor, an infrared transceiver such as the IrDA device available from Hewlett Packard, a boot program in electrically programmable read only memory such as the Model 27C256 EPROM from Advanced Micro Devices, a main program flash memory such as the 28F256 available from Advance Micro Devices, random access memory such as the Model 62256 from Advanced Micro Devices, additional input/output memory map decoder such as the ispGAL22V10 from Lattice, a 7-segment LED display driver available from a variety of sources, a cellular phone interface and an IDB bus interface, such as the Max481 available from Maxim.

The microprocessor resident in CIPN 300 (502 of FIG. 5) operates in external mode in order to address large blocks of memory. In addition to the serial communications on the microprocessor, the CIPN 300 will also have a dual universal asynchronous receiver transmitter chip. External address decoding and external latches are provided for additional I/O. The vehicle driver's two digit seven segment displays and the passenger's two digit seven segment displays will be driven from seven segment driving chips. In addition to EPROM, CIPN 300 also has flash EEPROM available for storage of configuration data. An infrared transmitter and receiver will reside on the CIPN board, in order to communicate with the palmtop computer 306 in IrDA protocol. An IIC bus controller is also on the CIPN 300 to facilitate communication with the vehicle's radio. A display dimming feature when the headlights are on will be performed in software using a timer interrupt.

Figure 4:
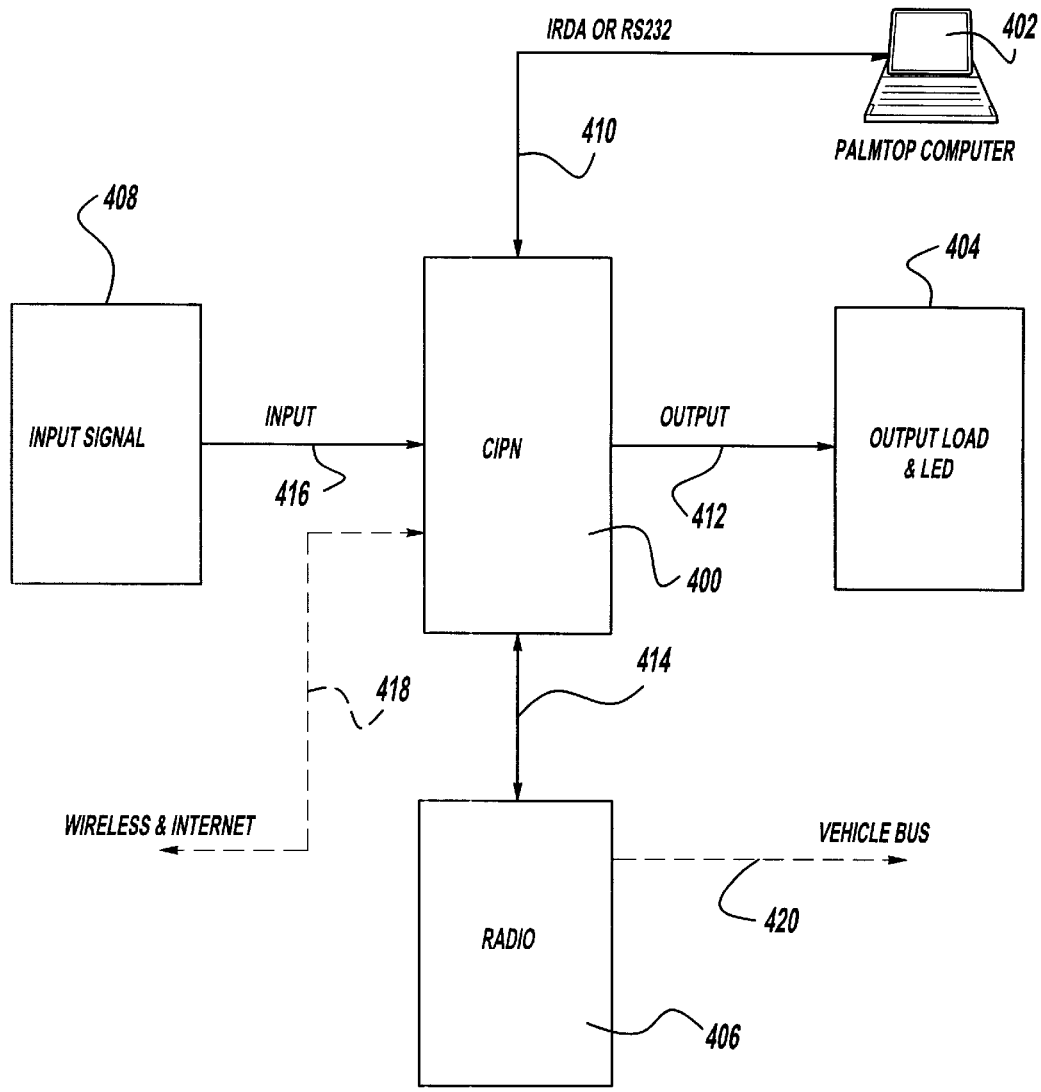
FIG. 4 is a functional block diagram of interface node connections arranged in accordance with the principles of the invention.

A more generalized functional block description of the communications architecture centered around the central instrument panel communications node is set forth in FIG. 4. CIPN 400 receives inputs over bus 416 from various input sources 408 to be described in more detail below with reference to FIGS. 3 and 5. CIPN 400 is coupled via medium 410 to palmtop computer 402. The coupling media may be either a hard wired bus utilizing, for example, RS232 protocol or media 410 would preferably comprise an infrared wireless link using IrDA protocol.

CIPN 400 will communicate via a cellular phone over medium 418.

CIPN 400 is coupled via bidirectional IIC bus 414 to the vehicular radio system 406. Radio system 406 is additionally coupled to a vehicle bus 420.

CIPN 400 provides outputs via bus 412 to various output loads and display devices 404 which will also be discussed in more detail below with reference to FIGS. 3 and 5.

The interconnections among the CIPN 300 and the various input and output devices associated therewith can be described with reference to the diagrams of FIG. 3 and FIG. 5.

HVAC System Inputs, Outputs and Controls

CIPN 300 receives vehicular HVAC inputs via bus 350 from AC on/off switch 344, temperature adjustment switch 342 (increase 342b and decrease 342a), and fan speed adjustment switch 340 (fan speed increase 340b and fan speed decrease 340a). Switches 340 *a* and *b* and 342a and *b* are push button momentary contact devices. Pushing the temperature increase switch 342b rotates a blend air door for more heat, while pushing temperature decrease switch 342a rotates the blend air door for less heat. Pushing the fan increase switch 340b increases the fan speed one step, while pushing the fan speed decrease switch 340a decreases the fan speed by one step.

CIPN 300 controls the air conditioning clutch via output 374 which leads to clutch 318. The output at 374 is toggled between on and off, based upon the air conditioning on/off switch position. When the air conditioner is on, the air conditioner light will illuminate on HVAC display panel 308.

CIPN 300 controls the blend air motor drive via lead 378 coupled to blend air door motor 314. The blend air door motor 314 is rotated in accordance with the increase and decrease temperature switches 342b and 342a. The position of the blend air door is monitored via resistor 316 coupled to CIPN 300 via lead 376. The position of the blend air door will determine the numerical setting on the HVAC displays.

HVAC blower motor 312 is controlled via CIPN 300 over bus 380. The motor is set to one of four states: off, low, medium and high. The state setting is based upon the fan speed switch input from switches 340a and 340b. The fan speed will increase one step each time the increase fan speed switch 340b is depressed and will decrease one step with each depression of fan decrease switch 340a.

The HVAC temperature setting is displayed at output display 310 via bus 382. Each digit comprises a seven segment LED. The output displayed is in a range from 65 (low) to 85 (high). The same number is displayed both at the central instrument panel for the driver and on optionally provided passenger displays. CIPN 300 allows for programmable calibration of the number range and the number displayed after a particular type of vehicle is assembled. Display 310 has two brightness states—full brightness when the headlamps are off and one-half brightness when the headlamps are on. This choice is determined by the headlamp input at lead 302.

Each HVAC mode display 308 is driven from CIPN 300 via bus 384. Seven light emitting diodes are illuminated to indicate the mode of operation:

LED 308a indicates defrost

LED 308b indicates defrost and panel

LED 308c indicates panel

LED 308d indicates panel and floor

LED 308e indicates floor

LED 308f indicates rear defrost

LED 308g indicates air conditioning output is on.

The LEDs of display 308 are colored to match the back lighting on the display of palmtop computer 306. Display 308 is used as a backup when palmtop computer 306 is not in place in its pod. When the computer is installed, display 308 is hidden underneath the palmtop computer.

Radio System Inputs, Outputs and Controls

CIPN 300 communicates with the audio system inputs via bus 360. Power on/off switch 338 is a momentary push button switch.

A continuously variable volume increase switch 336 utilizes a digital encoder input.

Mode select switch 330 is a push button device which toggles steps through AM/FM, set station, base, treble, fader, and balance.

The mode adjustment switch 328 comprises an increase push button 328b and a decrease push button 328a to step through selected mode values.

Station seeking is performed via push button switches 326a (seek down) and 326b (seek up) which are located on the vehicle's steering wheel. Additionally, these switches are used to seek a next desired CD track when in the CD mode.

As an alternative to the continuous volume adjustment switch 336, the volume may be increased or decreased in steps via push button switches 324a (decrease) and 324b (increase). These switches 324a,b are likewise located on the steering wheel.

CD ejection is effected via push button switch 332.

Finally, push button switch 334 is used to select AM/FM/CD operative modes of the audio system.

The radio system information is displayed using the existing radio display (part of 105 of FIG. 1) at the bottom 104 of the computer pod on the central instrument panel. This display is hidden under palmtop computer 202 of FIG. 2 and is visible when the palmtop computer is not resident in the pod. Hence, the radio information display may be directly connected to the radio with no requirement for coupling to CIPN 300.

An IIC electrical link 372 is provided between CIPN 300 and radio system 320. This link provides a communication pathway between the vehicular audio components and node 300. The protocol for this bidirectional bus 372 is dictated by the type of radio furnished.

Headlamp Dimming

A predetermined signal having a preselected voltage level and polarity on lead 302 is used to inform node 300 that the vehicle headlamps are on. This indication is used by node 300 to dim the LED displays and mode indicators.

Cellular Phone Interface

Node 300 interfaces a cellular phone via link 370 and interface 322. The vehicle's center instrument panel face plate can optionally include a separate remote speaker, volume control, dial (send) and mute switches. These switches interface directly with the cellular phone. The speaker and switches are specified and supplied by various cellular phone manufacturers. The cellular phone is controlled remotely via the palmtop computer and appropriate pull-down menu screens. The phone itself will not be built into the instrument panel, but will have a holder positioned at an appropriate place in the vehicle. The holder will be connectorized for establishing all electrical connections including a computer interface.

Palmtop Computer And Interface

Preferably, palmtop computer 306 is coupled to CIPN 300 via an infrared wireless link 304. Bidirectional link 304 conveys data and setting information. Several infrared interfaces will be positioned in the vehicle to facilitate remote operation of computer 306 by either the front seat passenger or rear seat occupants.

Alternatively, a wired bus using RS232 protocol could be used via a connector in the computer mounting pod.

Menu Screens

Figure 6:
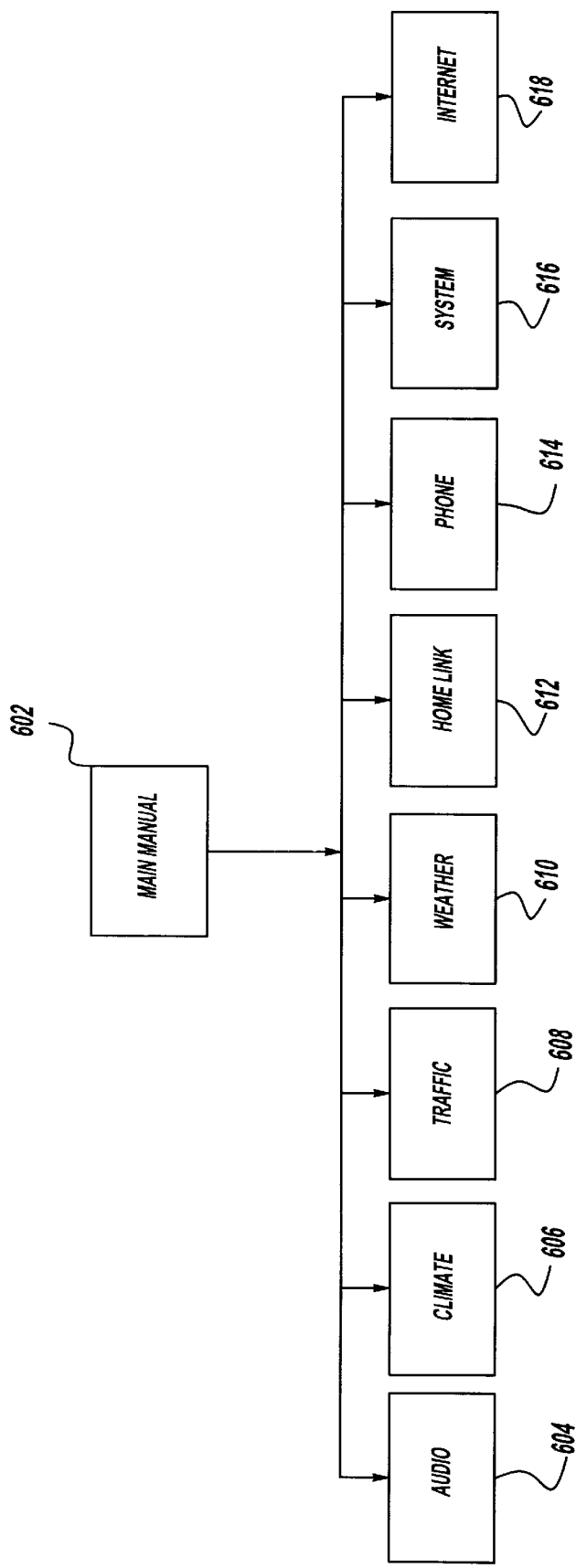
FIG. 6 is a diagram of a menu screen organization for the display of a palmtop computer coupled to the interface node.

With reference to FIG. 6, several top level pull-down menus will be used to control the vehicular electrical systems via palmtop computer 306 of FIG. 3. Other screens (not shown) are accessible from the top level screens shown on FIG. 6. Main manual or introduction screen 602 allows the user to select any of screens 604, 606, 608, 610, 612, 614, 616 or 618, which are described below. Screen 602 is the power-up default screen, and the driver (or passenger) selects another screen from screen 602.

The main audio screen 604 displays radio station and band information. CD track and time will be displayed when in the CD playing mode. On-screen functions available are: preset station select/set; station seek; and station tuning. It is also possible to enter either a speaker balance or base/treble screens from here. It is also possible to return to the primary screen 602 from screen 604.

An audio base/treble screen (not shown) may be accessed from audio screen 604. At the base/treble screen menu level, adjustments to base and treble are made. The user may return to primary audio screen 604 or to a speaker balance screen described below.

A speaker balance screen (not shown) is likewise accessible from the audio screen 604. The balance screen is used to make adjustments to the speaker position. It is also possible to return to the primary screen 602 or to go to the base/treble screen.

Climate screen 606 is utilized for setting fan speed, air conditioning state and to monitor outside temperatures. It is possible to return to the primary screen 602 or to proceed to a weather screen 610 via a short-cut key.

The traffic screen 608 is used in conjunction with internet access to locate up-to-date traffic information. This screen captures the impact of traffic information and makes it useable to the driver. Traffic "navigation" software may also be accessed at this point. Traffic reports enable the user to reroute the vehicle using cost effective, driver-selected route planning.

The weather screen 610 is likewise used in conjunction with internet access to locate up-to-date weather information. This screen captures the impact of this data and makes it available to the driver. Preprogrammed keys may allow the user to jump directly to internet sites that offer Nasa/satellite maps or to select weather in other regions of the globe.

Home net screen 612 enables internet access to a home computer web page site. The operator may interrogate the home site to check such things as alarm status, climate settings, light or appliance settings or to check for messages. This feature also enables the operator to turn on home heat, start lawn sprinklers, turn off appliances or tape a program via a VCR.

Internet screen 618 uses a standard web browser tool, such as Microsoft Internet Explorer. A preselected home page will be the default web site. The user is able to send and receive E-mail from this screen as well. The vehicle, in effect, becomes an address on the internet, allowing other computers to communicate with the vehicle to update software, down load fault codes or exchange information. The vehicle can be disabled via the palmtop computer in the advent of theft.

Vehicle system screen 616 is the vehicle monitor screen. This screen monitors the state of the vehicle engine, chassis and body electrical systems. This screen offers an enhanced level of diagnostics. Furthermore, it is possible with this screen for the operator to store personal preference information in the palmtop computer—e.g. favorite radio stations, seat positions, climate settings, etc. This personal preference information may be downloaded to the vehicle when the palmtop computer is docked to the pod at the instrument panel. The information could be changed virtually anywhere and downloaded to the car. The computer could be used as a "key" or "password" as a theft deterrent system. The vehicle could require the correct palmtop to be installed in the pod or the correct password to be entered for the vehicle to start.

Phone screen 614 is capable of using a standard phone interface software application, such as Motorola Star Tac CAC phone. The computer can store frequently called numbers for one button dialing. Hands-free phone use also is available.

In addition to the above screens, the standard vehicular application software can be exited and other palmtop software used. Any standard popular programs are then available for execution. It is preferable that this option be locked out when the vehicle is in motion.

CIPN/Palmtop COMPUTER INTERFACE MESSAGE PROTOCOL

The message level protocol between the palmtop computer and the CIPN may be implemented using a tethered RS232 cable link therebetween. However, it is preferable that the protocol be implemented using the IrDA protocol over an infrared link.

The protocol assumes that the CIPN collects certain state information from the radio regarding current settings such as volume, station, mode, etc. The protocol is an ASCII based protocol with variable length message which will contain only ASCII characters in the body of the messages. The messages will be preceded by a start of header (SOH) consisting of a predetermined hexadecimal pattern and a length byte. A check sum providing a cyclic redundancy check (CRC) will be provided at the end of each message. The purpose of variable length protocol is to enable future expansion. Messages originating from the palmtop computer are key depressions from the palmtop keyboard that will be translated into IIC messages and sent to the radio via the IIC bus. State information acquired from the radio in response to these keys will then be sent back to the palmtop computer.

The palmtop computer generally displays state information obtained from the CIPN (query message). This information is updated each time the palmtop computer sends an event to the CIPN or at any time the CIPN's internal states changes, e.g. due to a button press on the console. The main function of the CIPN in this protocol is to first translate events received from the palmtop computer into commands to the radio or to the HVAC system, and then to transmit current state information back to the palmtop computer to enable it to update its displays.

A "keep alive" message is transmitted by the CIPN periodically—e.g. every five seconds or some other calibratible value. The palmtop monitors this message in accordance with it's periodicity. If the "keep alive" message is not received in three attempts, the palmtop computer prepares a shut-down sequence. This condition could be caused by the CIPN failure or by a system power-off condition.

The palmtop computer transmits events to the CIPN in the message format given in Table 1 below. The three types of events are key down, key up, and query. The query event simply results in the CIPN returning the current state information to the palmtop computer.

TABLE 1

| Type Opcode | | Data Opcode | | |
| --- | --- | --- | --- | --- |
| Hex Code | Name/Direction | Hex Code | Name | Comment/Data Byte |
| 0x00-0x0f | Reserved | 0x00-0x0f | Reserved | |
| 0x51(Q) | Query | | | 0 Byte |
| 0x41(A) | Audio | | | |
| 0x41(A) | CIPN to HPC | 0x42(Band) | Station & CD | 3 Byte, Band, Freq., CD Info. |
| 0x41(A) | CIPN to HPC | 0x56(Volume) | Volume | 1 Byte for volume |
| 0x41(A) | HPC to CIPN | 0x50(Preset) | Preset Station | 1 Byte for station 1–5 |
| 0x41(A) | Both Way | 0x54(Tone) | Tone | 2 Byte, Detail next section |
| 0x41(A) | Both Way | 0x53(Speaker) | Speaker | 2 Byte, Detail next section |
| 0x41(A) | CIPN to HPC | 0x4B(seeK) | Seek | 0 Byte |
| 0x43(C) | Climate | | | |
| 0x43(C) | CIPN to HPC | 0x41(A/c) | AC On/Off | 1 Byte On/Off |
| 0x43(C) | CIPN to HPC | 0x46(Fan) | Fan Level | 1 Byte, 4 Level Indication |
| 0x54(T) | Traffic | | | Define By Future |
| 0x57(W) | Weather | | | Define By Future |
| 0x48(H) | Home Net | | | Define By Future |
| 0x50(P) | Phone | | | Define By Future |
| 0x53(S) | System | | | Define By Future |
| 0x49(I) | Internet | | | Define By Future |
| 0x4B(K) | Keep alive | | | 0 Byte, Every 5 Second |

The palmtop computer and the CIPN must respond after each received message with an ACK or NACK signal. In the event of lack of a response in a predetermined time period, such as 200 milliseconds, it is the responsibility of the originating unit to retry the transmission three times and then, if still unsuccessful, to label the link as "down". In the event of receiving a NACK message, the originating element retransmits the message.

CIPN Software Considerations

The main loop of the software operating system of the CIPN's microcomputer (502 of FIG. 5) polls flags set by the various switches and scan points in interrupt levels. First, a check is made of the IR flag for a complete, validated message from the palmtop computer. The message will be copied into a buffer, the interrupt routine notified, the data parsed and the appropriate action or message executed. The cellular phone message flag will next be checked for a complete, validated message. If there is a phone message present, the message will be copied into a buffer, the interrupt routine notified, the data parsed and the appropriate action taken. IDB bus is included in the main loop. The IDB supports future expansion, such as pager, phone, GPS, etc. The IIC bus (radio) flag is checked for a complete validated message. The message will be copied into another buffer and the interrupt routine will be notified. The data will be a response message to a previous command setting to the radio. The last input flag check is made for a valid key press. A timed interrupt occurs periodically, for example, every 8.19 milliseconds. The time interrupt routine polls the push button switches and performs button debounce as well as button repeat. The time interrupt routine will then map the button pressed to an ASCII capital letter and store it for the main loop routine's use. The main loop will act as if it has a keyboard input. If a flag is set for the main loop indicating that a key is present, then that key will be taken. The key will be marked as taken for the sake of the main polling loop, but the interrupt routine will not need to be notified. The low level button routine will overwrite with last key pressed. A debug terminal is polled for input during the main loop and will support memory monitoring and editing, as well as monitoring the communication protocols.

Interrupts are generated on input from the IrDA port, the IIC bus and the cellular phone. The information is buffered, and when the end of the packet is reached and the message is valid, the information is moved to a new buffer, the flag for "message ready" will be set, and pointers will be reset to use the input buffers from the start.

The communications software supports four protocols—IIC bus, IrDA, three wire bus and IDB. When incoming messages are received, the main loop passes the message to the corresponding software middle layer for decoding. The appropriate status is passed back to the main processing loop where the appropriate action takes place, such as formatting the message for another protocol. The formatted message would then be sent to the middle layer with the correct protocol manager where the message would become queued and sent in turn.

System initialization software is stored in a flash EEPROM. After a boot is performed from EPROM, the flash executable code section will be cyclic redundancy checked. If this section does not pass the check, then it will be assumed that power was lost during a flash update through the infrared port. The section of flash EPROM used to buffer the packets will be checked for completeness and correctness. If the buffer is correct, then the contents will be copied to the executable area. If the buffer is incorrect, the CIPN will monitor the infrared port to look for a firmware upgrade.

Figure 5:
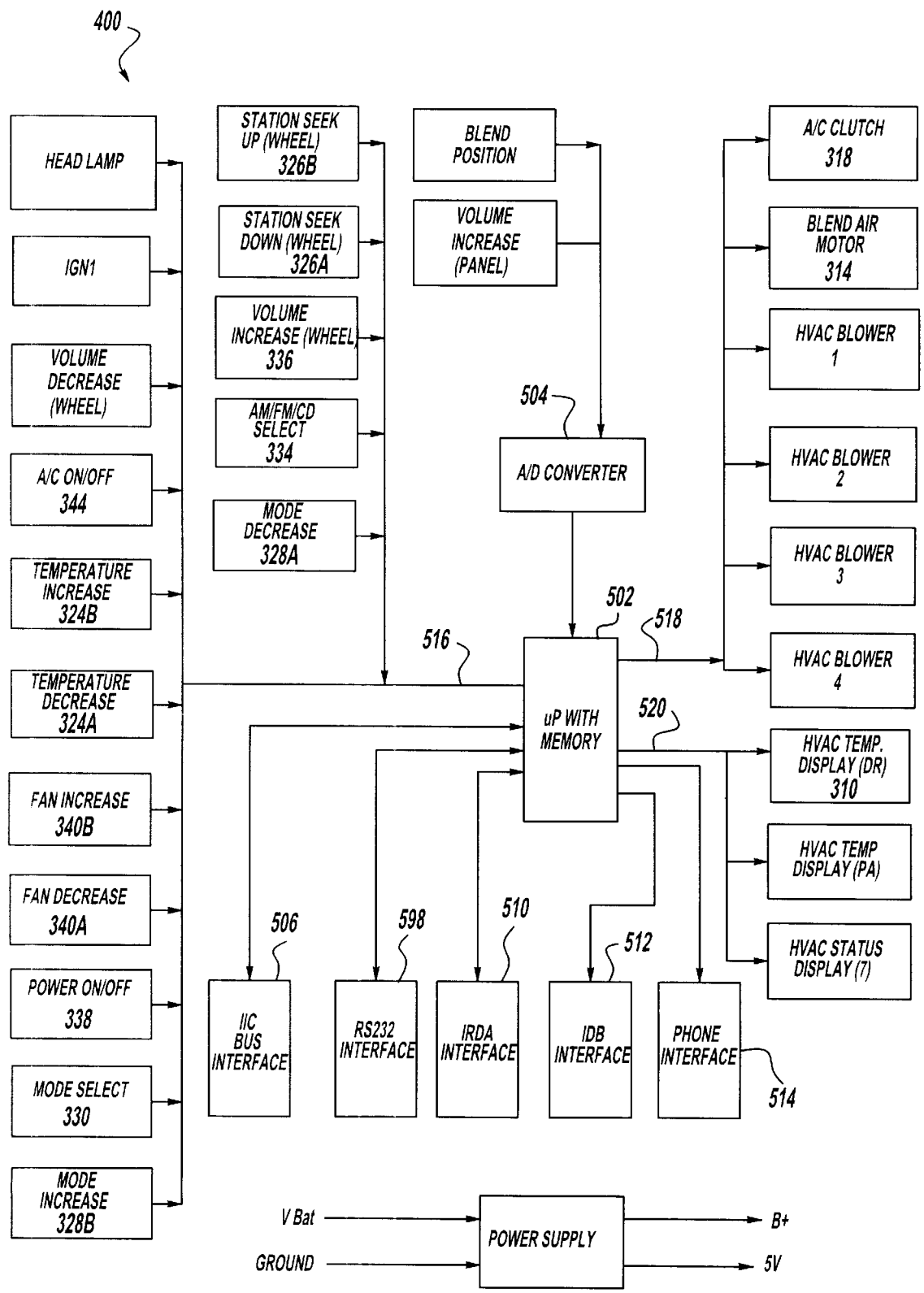
FIG. 5 is a more detailed functional block diagram of the interface node of FIG. 4.

Having initialized the microprocessor 502 of FIG. 5, various variables and interrupt vectors, there will be a check of non-volatile configuration memory for an initialization string of characters. If the memory check is incorrect, CIPN 400 will perform a calibration sequence for the blend air door position. The door will be moved to one extreme, a voltage reading will be taken through the microprocessor's analog to digital port 504. The door will then be moved to the other extreme and a second voltage reading will be taken. The position resistor is selected to be substantially linear between these extremes. The blend air door will be left in the low position. The voltage range will be subdivided to obtain equal positioning from 65 to 85. This calibration will be stored in the microprocessor's non-volatile memory. The other systems will be initialized to off, then the initialization string will be written to non-volatile memory. However, if the initialization string is found correct, the CIPN will set everything to its last value.

The inputs and outputs for the CIPN microcomputer are set forth in Table 2 below.

TABLE 2

Input and Outputs for CIPN Microcomputer (Motorola MC68HC11K4)

| PORT | Input | Output | Description |
|---|---|---|---|
| A0 | | X | bits A0 and A1 select which of 4 relays to tun on to control the fan speed |
| A1 | | X | see above |
| A2 | | X | A/C momentary contact switch |
| A3 | | X | Temperature increase momentary contact switch (mcs) |
| A4 | | X | Temperature decrease mcs |
| A5 | | X | Fan Speed increase mcs |
| A6 | | X | Fan Speed decrease mcs |
| A7 | | X | bit to provide power to blend door position motor |
| D2 | | X | Mode select button mcs |
| D3 | | X | Mode increase mcs |
| D4 | | X | Mode decrease mcs |
| D5 | | X | Station seek UP mcs |
| E0 | X | | A/D converter for rotary switch for volume |
| E1 | X | | A/D converter for Blend Door Position |
| E2 | | | A/D converter - not used |
| E3 | | | A/D converter - not used |
| E4 | | | A/D converter - not used |
| E5 | | | A/D converter - not used |
| E6 | | | A/D converter - not used |
| E7 | | | A/D converter - not used |
| PH0 | | X | Station seek down mcs |
| PH1 | | X | Volume increase mcs |
| PH2 | | X | Volume decrease mcs |

The boot software and the infrared link protocol will be reside in EPROM. If a need arises to do a firmware upgrade, the software can be downloaded from the infrared link to random access memory of the microcomputer. The downloaded code will be checked for completeness and correctness, and then the flash memory will be updated to the new executable code.

Figure 7:
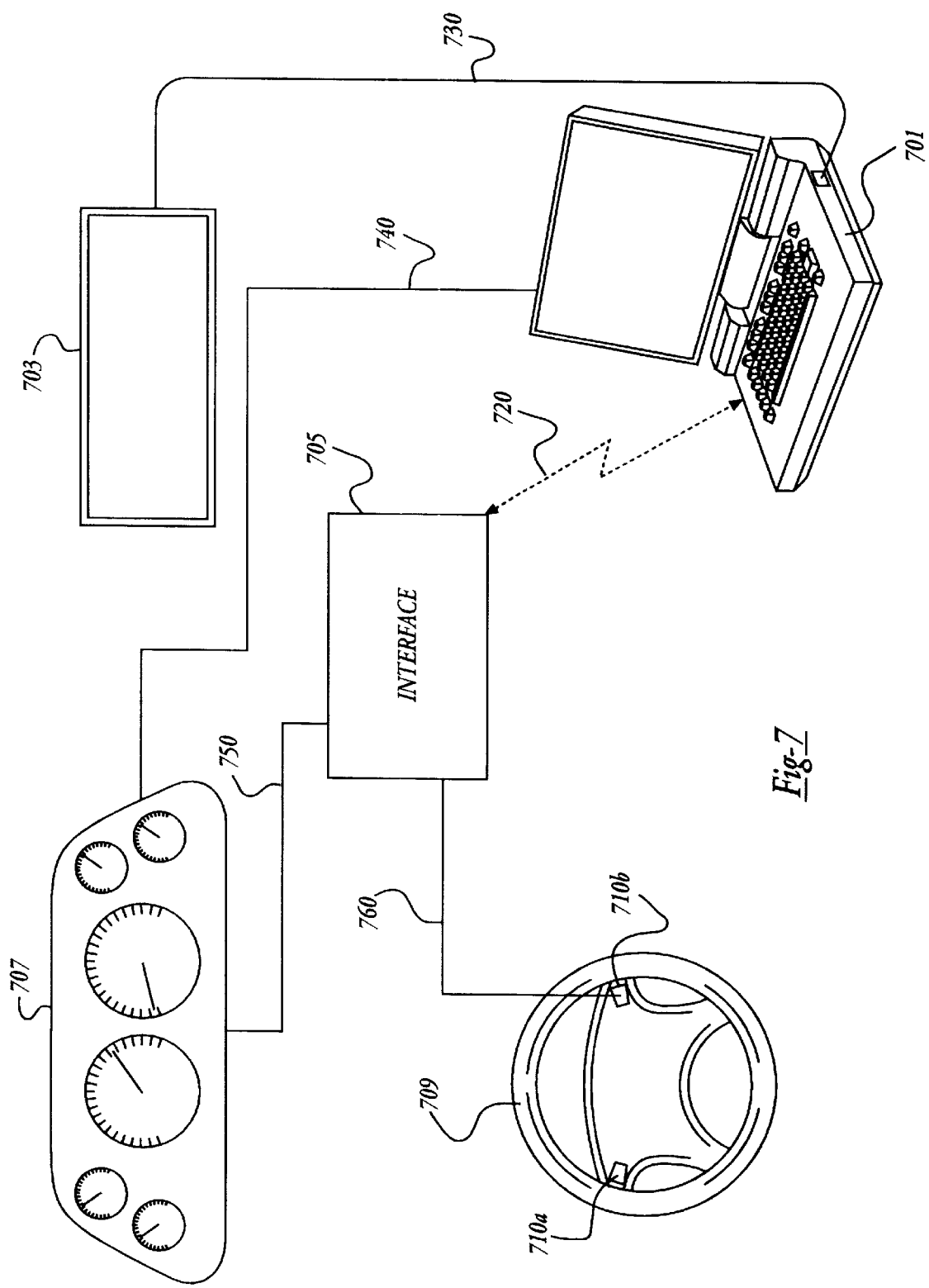
FIG. 7 is a functional block diagram of an alternative embodiment of the invention.

An alternative embodiment of the invention may be described in conjunction with the functional block diagram of FIG. 7. In this embodiment, the vehicle utilizes a "docked" or removable computer, such as a laptop or notebook model, to enhance vehicle functionality. The removable computer philosophy enables the system to be upgraded externally to the vehicle as new computer or software technology products become available. Computer 701 of FIG. 7 is supplied by the vehicle owner and is attached to in-vehicle hardware.

With reference to FIG. 7, computer 701 is coupled via a data link 720, which is preferably an infrared data link, to an interface unit 705 which is coupled to at least one of the built-in computer systems of the vehicle, such as a vehicle body controller (not shown).

Interface 705 is additionally coupled via bus 750 to an instrument cluster 707 and via bus 760 to hub switches 710a and 710b mounted to the hub of steering wheel assembly 709.

Computer 701 has a VGA video output coupled via connectorized bus 730 to an information display unit 703 which is mounted in the instrument panel center stack.

Computer 701 is also coupled via connectorized bus 740 to a camera and microphone assembly mounted in the instrument cluster 701.

With the arrangement as shown in FIG. 7, computer 701 will perform the following basic functions.

Computer 701 drives the center instrument panel display 703 via video link 730.

Computer 701 monitors the in-vehicle microphone at assembly 707 for voice commands and/or voice dictation.

Computer 701 is connected via bus 740 to the assembly 707 such that an installed camera, such as a CMOS device, may capture the image of the vehicle operator and transmit same to computer 701. Computer 701 then may forward via the internet the image information for confirmation of an authorized vehicle operator or for permanent recording of the vehicle operator's identity.

Computer 701 is data linked via infrared link 720 with at least one of the in-vehicle computer systems, such as the body computer, for screen selection information, driver control switch status, vehicle communication bus data and basic commands.

Computer 701 may contain the hardware/modem apparatus necessary to link to the internet via a wireless connection.

Finally, computer 701 may contain the linkage hardware necessary to dial up a cellular telephone.

The driver information display 703 is preferably a rectangularly shaped display device. Presently contemplated displays useful with this invention include, for example, field emission displays, light emitting polymer displays and liquid crystal displays. The signal from computer 701 driving the display 703 via link 730 may also be used to drive a large screen projector or television monitor for external viewing purposes.

Hence, computer 701 will operate graphically through the monitor 703, and standardized screens shown on display 703 may be organized around the following basic menu screens.

In the Main Menu Screen, a graphic is displayed along with the next six optional screens described below.

The Mobile Office Screen will be used for basic office or planning functions. This may include an appointment calendar, contact list, vehicle mileage logs, or facsimile.

The Security Screen will exhibit security settings such as a "captured" camera picture, or global positioning system tracking information for vehicle theft recovery.

The Internet Screen will operate a functional mobile internet connection. Bookmarked sites may be accessed for traffic, weather or E-mail.

The Vehicle Systems Screen will exhibit preselected data from the vehicular systems normally available from the built-in vehicle computers. Additionally, in this screen, owner's manual function help menus and vehicle diagnostics may also be shown. Conventional trip computer information may also be exhibited.

In the Navigation Screen, a navigation system map with global positioning system position information will be displayed. Maps may include an overlay of local traffic information derived from the internet.

The Phone Interface Screen is used to interface to a docked cellular phone within the vehicle. This screen will allow for contact selection and voice dialing of contacts or raw phone numbers.

The invention has been described with reference to an exemplary embodiments. This description is for the sake of example only, and the scope and spirit of the invention are to be construed by appropriate interpretation of the appended claims.

What is claimed is:

1. A system for enabling communication between a removable stand-alone computer, a built-in display and a built-in computer system of a vehicle, the system comprising:
    a communication interface positioned at a first preselected location within the vehicle;
    a second preselected location within the vehicle for receipt of the stand-alone computer;
    a communications medium coupling the stand-alone computer to the communication interface;
    a video display mounted in the instrument panel of the vehicle; and
    a video link coupling display information from the stand-alone computer to the video display such that the stand-alone computer can be operated graphically through the video display.

2. The system of claim 1 further comprising a built-in vehicular microphone for receipt of voice commands and voice dictation, the microphone coupled to a port of the stand-alone computer.

3. The system of claim 1 further comprising a camera positioned for capturing an image of an operator of the vehicle, the camera having an output coupled to the stand-alone computer.

4. The system of claim 1 wherein the communications medium comprises an infra-red data link.

5. The system of claim 1 wherein the communications interface couples the stand-alone computer to at least a body computer of the vehicle.

\* \* \* \* \*